United States Patent [19]

Gutfleisch

[11] Patent Number: 4,991,992
[45] Date of Patent: Feb. 12, 1991

[54] COUPLING OF TWO SHAFT PARTS OF TOOTHED PROFILES

[75] Inventor: Siegfried Gutfleisch, Bisingen, Fed. Rep. of Germany

[73] Assignee: Mercedes-Benz AG, Fed. Rep. of Germany

[21] Appl. No.: 413,191

[22] Filed: Sep. 27, 1989

[30] Foreign Application Priority Data

Oct. 19, 1988 [DE] Fed. Rep. of Germany ....... 3835544

[51] Int. Cl.$^5$ .................................................. F16D 3/06
[52] U.S. Cl. ...................................... 403/359; 403/371; 464/162
[58] Field of Search ............... 403/359, 371, 366, 372, 403/368, 313, 365; 192/71, 72, 93 C; 464/162

[56] References Cited

U.S. PATENT DOCUMENTS

| 3,335,580 | 8/1967 | Simpson, Jr. ................. | 403/359 X |
| 4,185,475 | 1/1980 | Kleinschmidt ................. | 403/313 X |
| 4,292,001 | 9/1981 | Snell ........................ | 403/359 |
| 4,630,690 | 12/1986 | Beasley et al. ............... | 403/371 X |
| 4,886,481 | 12/1989 | Gutfleisch et al. ............ | 403/359 X |

FOREIGN PATENT DOCUMENTS 6933918 8/1969 Fed. Rep. of Germany .
3729393 5/1988 Fed. Rep. of Germany .

Primary Examiner—Peter M. Cuomo
Attorney, Agent, or Firm—Evenson, Wands, Edwards, Lenahan & McKeown

[57] ABSTRACT

A coupling device for a torque transmitting, longitudinally displaceable coupling of two shaft parts formed by toothed profiles is arranged to ensure backlash free meshing of the toothed profiles in the direction of rotation. An intermediate bush is provided between both shaft parts, which intermediate bush meshes with their toothed profiles and is slit like a collet at both bush end areas. A clamping and expanding members are respectively allocated on the shaft side to the slit bush end areas, which clamping and expanding members come into mesh with the shaft parts during coupling of the latter and, under the action of an axially directed contact force, avoid, by compression and expansion respectively of the slit bush end areas, flank clearance between the toothed profiles coming into mesh with one another.

6 Claims, 1 Drawing Sheet

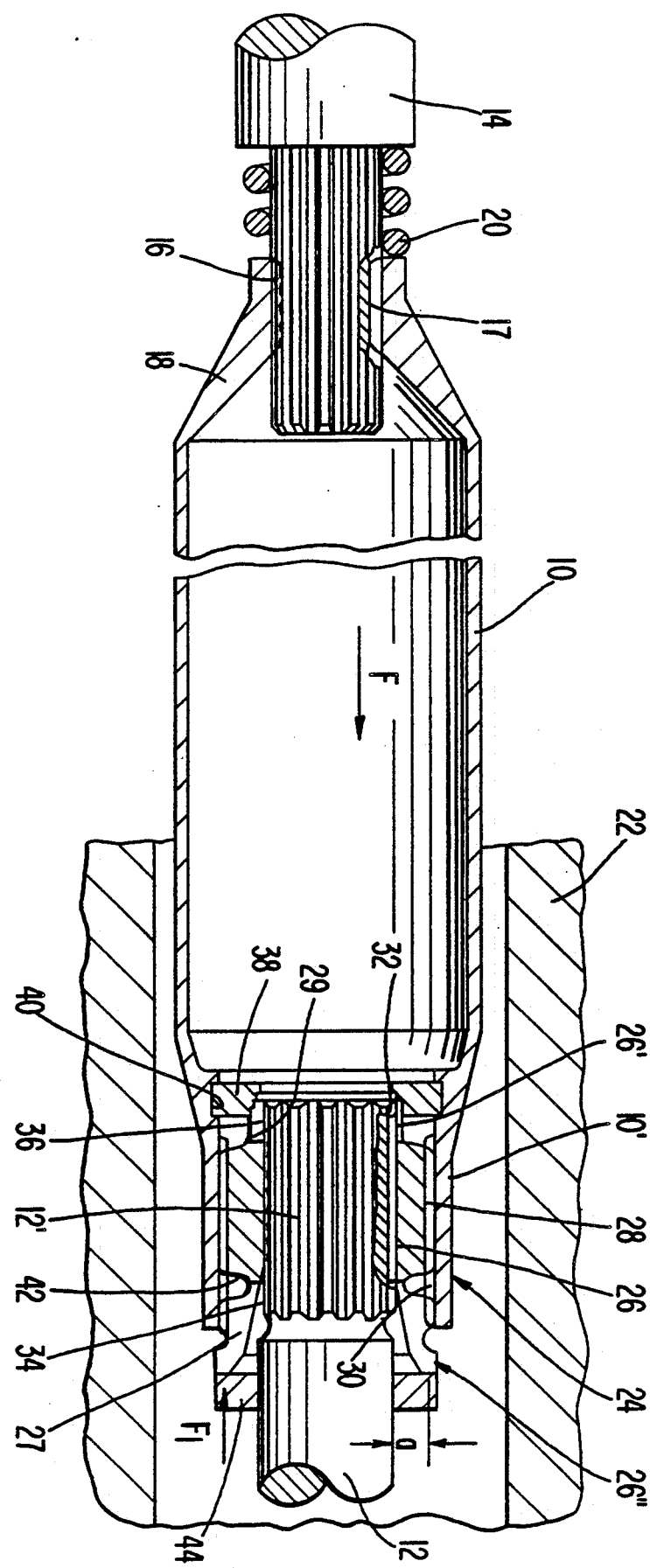

COUPLING OF TWO SHAFT PARTS OF TOOTHED PROFILES

BACKGROUND AND SUMMARY OF THE INVENTION

The present invention relates to a coupling device for a torque transmitting, longitudinally displaceable coupling for two shaft parts having toothed profiles.

A coupling device of this type is disclosed by German Patent Specification No. 3,729,393, which serves to keep the toothed profiles of both shaft parts largely free from backlash while maintaining an axial mobility of the shaft parts, coaxial to one another, in their peripheral direction.

The coupling part coupling the two shaft parts to one another so as to be fixed in terms of rotation is here formed by a hub-like end piece of one shaft part which is slit like a collet at a free end area thereof. This end piece is equipped with an internally toothed profile which meshes with an externally toothed profile of a meshing part overlapped by the hub-like shaft end piece and provided so as to be fixed in terms of rotation on the other shaft part. This meshing part is formed by the end piece of the other shaft part projecting into the hub-like end piece of one shaft part.

In order to keep mutual meshing of both toothed profiles free from backlash in the direction of rotation of the shaft parts, a clamping member, such as a slightly conical annular spring, which can be pressed against a stop while both shaft parts are thrown into mutual mesh, sits on the end area of the hub-like end piece of one shaft part which is slit like a collet. A radially directed clamping force is thereby produced on the hub legs formed by the slitting of the hub-like shaft end piece to provide segment-shaped in cross-section. This clamping force presses these hub legs, with their internal tooth system, into spaces of the external tooth system of the other shaft part in order to keep adjacent meshing of the toothed profiles in contact with one another in a manner free from backlash.

In a further coupling device of similar design disclosed by German Utility Model No. 6,933,918, a clamping member, which forms a ring for overlapping the slit, hub-like shaft end piece, is conically widened on the inside in a clamping direction and further overlaps the segment-shaped hub legs in a positive-locking manner.

To produce a radially directed clamping force acting on the hub legs, the ring, via a compression spring bearing against the accessible ring end face, is supported on a clamping member which is formed by a sleeve overlapping the slit, hub-like shaft end piece and screwed onto the external thread of the same so as to be locked against rotation.

Therefore, an object of the present invention is to provide a coupling device in which a backlash free meshing of toothed profiles is achieved.

In this coupling device, it is to be possible, in particular, to couple shaft parts to one another which are equipped with toothed profiles of various design and/or have different diameters.

The coupling device according to advantageous embodiments of the present invention is thus distinguished by an intermediate bush which is arranged between both shaft parts to be coupled to one another, is in mesh with their toothed profiles and has a collet-like design at both end areas. In this arrangement, when one slit front end of the intermediate bush is pressed against the stop, the same, by radial expansion, is thrown into positive locking mesh with the internally toothed profile of the hub-like shaft part, and its other slit front end, when interacting with the clamping member, is thrown by radial compression into positive-locking mesh with the externally toothed profile of the other shaft part.

The intermediate bush here forms a reducing piece which, at the outer and inner periphery, can facultatively be equipped with toothed profiles differing from one another, depending on whether the shaft parts to be couple have the same or different toothed profiles. The intermediate bush thus enables shaft parts to be coupled which have different types of tooth systems, for example DIN and SAE tooth systems. In addition, the invention provides the important advantage that both shaft parts can be at least largely separated vibrationally from one another provided the intermediate bush is made from a suitable material, for example, glass fiber-reinforced plastic.

Other objects, advantages and novel features of the present invention will become apparent from the following detailed description of the invention when considered in conjunction with the accompanying drawings.

BRIEF DESCRIPTION OF THE DRAWING

A motor vehicle drive shaft equipped with a coupling device, according to one embodiment of the present invention and running, for example, in an axle tube, is shown in truncated representation in the single drawing FIGURE of the present application.

DETAILED DESCRIPTION OF THE DRAWING

A drive shaft 10 serves, for example, to drive a pinion shaft 12 of a rear-axle transmission. The drive shaft 10 is drivable, for example, by a transmission output shaft 14 of the vehicle drive unit provided at the front of a vehicle. Both shafts 10, 14 are connected to one another so as to be fixed in terms of rotation but axially displaceable. To this end, the transmission output shaft 14 is equipped with a shaft journal 16 which has a multiple splined profile on the periphery and is in mesh with a shaft hub 18 having a corresponding internally splined profile 17. Arranged between both shafts 10, 14 is a preloaded compression spring 20 which sits on the shaft journal 16 and whose purpose will be described in greater detail below.

The drive shaft 10 is designed in one piece and arranged in a known manner in an axle tube 22 rigidly connecting the drive unit, including, for example, an internal combustion engine and transmission, to the rear-axle transmission. A coupling device, generally designed at 24, serves as a torque transmitting and longitudinally displaceable connection between drive shaft 10 and pinion shaft 12. To this end, an end piece 10' of the drive shaft 10 is designed like a hub and overlaps a free end piece 12' of pinion shaft 12 having an outside diameter which is smaller than an inside diameter of the hub-like shaft end piece 10'.

Arranged between both end pieces 10' and 12' is a bush-like coupling part 26 which, on one side having an externally toothed profile 28, is in mesh with an internally toothed profile 30 of the shaft end piece 10' and, with an internally toothed profile 32, is in mesh with an externally toothed profile 34 of the shaft end piece 12'.

The coupling part 26, thus forming an intermediate bush, is slit like a collet at bush end pieces 26' and 26". The bush end piece 26' has a relatively small outside diameter, and is conically tapering at a front end and in mesh with a conical inner peripheral surface 36 of an annular clamping member 38, which in turn is inserted into the hub-like shaft end piece 10' in an axially secured manner. For this purpose, the clamping member 38 forms a snap ring which engages into a corresponding inner peripheral groove 40 of the shaft end piece 10'.

Instead of a snap ring arrangement, the conical inner peripheral surface 36 can also be provided in an annular web integrally formed on an inner periphery of the hub-like shaft end piece 10'. In this case, the internally toothed profile 30 would have to be produced in a known manner by hammering on the outer periphery of the shaft end piece 10', whereas the profile 30, can be formed in the shaft end piece 10' by means of a pull broach when using a clamping member 38 in the form of a snap ring.

In an area of the bush end piece 26", the inside diameter of the intermediate sleeve 26 widens conically outwards, in which arrangement clamping legs 27, formed by slitting and leading to the rest of the bush part of the intermediate bush, are stepped in a transition area by a peripheral groove 42 formed in an outer periphery of the intermediate bush 26 and are held in a flexibly elastic manner due to the cross-sectional reduction thereby achieved.

Allocated to the bush end piece 26" is a stop 44 against which the intermediate bush 26 bears to expand the legs 27 of this bush end piece 26".

As the single FIGURE shows, the externally toothed profile 28 also extends at least over a sectional piece to the clamping legs 27, the latter being in mesh with the hub-like shaft end piece 10'.

Both shafts 10 and 12, when mutually thrown into mesh, are automatically coupled to one another by the coupling device 24 in such a way that their torque-transmitting connection in the peripheral direction automatically takes place free from backlash. This is brought about, inter alia, by the compression spring 20, which exerts an axial force F on the shaft 10 which causes the clamping member 38, designed as a snap ring, to act on the slit bush end piece 26' and push its clamping legs 29, equipped with the internally toothed profile 32, into the tooth spaces of the externally toothed profile 34 of the shaft end piece 12' until tooth flanks adjacent to one another bear against one another free from backlash. At the same time, the front end of the slit bush end piece 26" is brought into contact with the stop 44 sitting on the shaft part 12, a counterforce $F_1$ being set up against the contact force F, which counterforce $F_1$ is split up into a horizontal and a vertical force component. The distance of the point of application of the counterforce $F_1$ from the outer periphery of the shaft part 12 here results in a torque under whose effect the clamping legs 27 are bent outwards, and in the process the sectional piece of the externally toothed profile 28 of the intermediate bush 26 provided on the clamping legs, is pressed into the internally toothed profile 30 of the shaft end piece 10' for a backlash free, mutual meshing of both toothed profiles 28, 30.

The coupling device 24 thus described enables the toothed profiles 28, 30, 34 in mesh with one another to automatically compensate for backlash on a flank side, in which arrangement the coupling device 24 can be at an inaccessible location as, for example, in the case of an axle tube 22.

Instead of the stop 44, a cone, for example, could also sit on the pinion shaft 12, which cone extends into the slit bush end piece 26" tapering conically inwards. In this case, the clamping legs 27 could be provided inside the shaft end piece over their entire length. In addition, the stop 44 could be formed, for example, by the sectional piece, protruding into the axle tube 22, of a transmission housing in which the pinion shaft 12 is mounted.

The intermediate bush 26 can be made as a pressed or extruded shaped part, in particular of glass fiber-reinforced plastic, and can thus be suitable as a means of separating vibrations between the two shaft parts 10, 12 coupled to one another.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A coupling device for permitting a certain axial displacement of a rotationally rigid connection between two shaft parts having toothed profiles in which one shaft part, with a hub-like end piece, overlaps an end piece of the other shaft part, said end pieces of the two shaft parts being coupled to one another by a coupling part which is slit at one end to form a collet and which, with an internally toothed profile, meshed with an externally toothed profile of a meshing part overlapped by the hub-like end piece and fixed in terms of rotation to the other shaft part, whereby, when said meshing part and slit coupling part are mutually thrown into mesh, said coupling part, when pressing against a stop, being radially compressed by a clamping member, wherein the coupling part forms an intermediate bush arranged between both shaft parts, the coupling part forming the intermediate bush having an externally and an internally toothed profile which respectively mesh with a corresponding mating toothed profile of the shaft parts, wherein the clamping member interacts with a slit end piece of the intermediate bush and is provided inside the hub-like end piece and another end piece of the intermediate bush being slit like a collet and accommodated by the hub-like end piece at least over a sectional piece and also having, at least along this sectional piece, an externally toothed profile on a bush side extending to the slit so as to be radially expandable by pressing against said stop.

2. A coupling device according to claim 1, wherein the clamping member is at least one of a ring inserted into the hub-like end piece and an inner annular shoulder which is integrally formed thereon and has an opening conically widening in a direction of the slit end piece of said intermediate bush and in engagement with the latter.

3. A coupling device according to claim 2, wherein a diameter of the slit end piece of said intermediate bush interacting with the clamping member is substantially reduced compared with a diameter thereof having the externally toothed profile.

4. A coupling device according to claim 3, wherein an inside diameter of the other end piece of said intermediate bush facing the stop means is conically widened over a slit area in a direction of a bush end, and wherein longitudinal slits of the intermediate bush lead out into a bush peripheral groove located inside the hub-like end piece.

5. A coupling device according to claim 4, wherein the stop means is formed by at least one of a ring and a ring nut sitting on the shaft part meshing with the intermediate bush.

6. A coupling device according to claim 5, wherein the two shaft parts to be coupled to one another are end pieces of an axle drive shaft and a pinion shaft of an axle transmission of a motor-vehicle drive line respectively, and wherein the shaft end, carrying the stop, of the pinion shaft projects into a tube end of a central tube flange mounted on both the engine transmission and the axle transmission of a motor vehicle and accommodating the axle drive shaft.

* * * * *